US009933926B2

(12) United States Patent
Young et al.

(10) Patent No.: US 9,933,926 B2
(45) Date of Patent: Apr. 3, 2018

(54) METHOD AND SYSTEM FOR MEDICAL DATA DISPLAY

(71) Applicant: Synaptive Medical (Barbados) Inc., Bridgetown (BB)

(72) Inventors: Norman Young, Toronto (CA); Jasper Yeh, Thornhill (CA); Thanh Duc Huynh, Markham (CA); Jonathan Resnick, Toronto (CA); Steven Richard Wranovsky, Muskego, WI (US); Wesley Bryan Hodges, London (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 0 days.

(21) Appl. No.: 14/866,007

(22) Filed: Sep. 25, 2015

(65) Prior Publication Data

US 2017/0090724 A1  Mar. 30, 2017

(51) Int. Cl.
*G06F 3/048* (2013.01)
*G06F 3/0484* (2013.01)
*G06F 3/0354* (2013.01)
*G06F 3/0482* (2013.01)
*G06F 17/24* (2006.01)

(52) U.S. Cl.
CPC ...... *G06F 3/04842* (2013.01); *G06F 3/03543* (2013.01); *G06F 3/0482* (2013.01); *G06F 3/04845* (2013.01); *G06F 17/24* (2013.01)

(58) Field of Classification Search
CPC ...................................... G06F 3/048
See application file for complete search history.

(56) References Cited

U.S. PATENT DOCUMENTS

| 8,601,385 | B2 | 12/2013 | Natanzon et al. | |
| 2006/0013462 | A1 | 1/2006 | Sadikali | |
| 2008/0295023 | A1 | 11/2008 | Matsumoto | |
| 2009/0192823 | A1* | 7/2009 | Hawkins | G06F 19/321 705/3 |
| 2010/0050114 | A1* | 2/2010 | Braun | G06F 3/04817 715/788 |
| 2010/0131890 | A1* | 5/2010 | Natanzon | G06F 3/0481 715/808 |
| 2012/0131498 | A1* | 5/2012 | Gross | G06F 17/30274 715/788 |
| 2013/0239062 | A1 | 9/2013 | Ubillos et al. | |
| 2014/0143710 | A1* | 5/2014 | Zhao | G06F 19/321 715/781 |

* cited by examiner

*Primary Examiner* — Xuyang Xia
(74) *Attorney, Agent, or Firm* — Kagan Binder, PLLC (57) ABSTRACT

A system for efficiently displaying medical data to a user. For one or more of the image series, the system displays a thumbnail image representing the image series in a secondary segment of a display. In response to a selection of one of the displayed thumbnail images the system displays in the secondary segment a positioning grid with multiple sections, each section representing a section of a separate primary segment of the display that does not overlap the secondary segment. In response to a selection of one of the sections in the positioning grid the system updates the display to cause an image in the image series corresponding to the selected thumbnail image to be displayed in the section of the primary segment of the display represented by the selected section of the positioning grid.

17 Claims, 4 Drawing Sheets

METHOD AND SYSTEM FOR MEDICAL DATA DISPLAY

FIELD OF THE INVENTION

The present invention relates generally to systems and methods for displaying medical information relating to a patient, and more particularly to systems and methods for displaying medical information including DICOM image series.

BACKGROUND OF THE INVENTION

Many systems exist for displaying medical images and other medical information to users, such as radiologists and other medical professionals. Such medical information can take many forms such as text reports, reports including graphics, individual images, videos, and image series and studies. When viewing images in an image study, it is often important to be able to display multiple images from multiple series at the same time so that they can be compared side-by-side. For example, four or eight series may be displayed at the same time. This is typically done by presenting to the user an indicator, such as a thumbnail, for each series, and then allowing the user to drag the thumbnail to a particular portion of the screen using a mouse where it is to be displayed. However, this approach requires a lot of mouse travel and can lead to strain on the user's hand/arm. Also it requires a significant amount of time to lay out the study.

SUMMARY OF THE INVENTION

In various examples, the present disclosure provides systems and methods, and improvements to systems and methods, for displaying content in a primary segment of a display. The content includes medical images organized as image series. For example, these may be DICOM image series.

In preferred embodiments, the system includes one or more input devices for receiving input from a user (such as a mouse and a keyboard), a display device (or multiple display devices) for displaying images and information to the user, and a computer processor in electronic communication with the input device(s) and the display device. The computer processor is configured, for example by software running on the processor, to perform several functions. For one or more of the image series, the processor displays a thumbnail image representing the image series in a secondary segment of the display on the display device. The primary segment and secondary segment do not overlap. The processor receives a selection of one of the displayed thumbnail images from the input device, and in response to the selection of one of the displayed thumbnail images, the processor displays in the secondary segment a positioning grid with multiple sections. Each section of the positioning grid represents a section of the primary segment of the display. After the positioning grid has been displayed, the processor receives a selection of one of the sections of the positioning grid from the input device. Then, in response to the selection of one of the sections in the positioning grid, the processor updates the display to cause an image in the image series represented by the selected thumbnail image to be displayed in the section of the primary segment of the display represented by the selected section of the positioning grid.

In preferred embodiments, a timeline is displayed in the secondary segment of the display. The timeline includes multiple content entries. Each content entry has a date associated with it, and corresponds to content that can be displayed. One or more of the content entries corresponds to image studies. One or more of the image studies includes multiple image series, and for each of one or more of those image study content entries, one or more of the corresponding image series is represented in the timeline by a content entry that is a thumbnail image of one of the images in the image series. One or more of the content entries may correspond to text files, in which case when one of the text file content entries is selected, a portion of the content of the text file corresponding to the selected text file content entry is displayed by the computer processor in the primary segment of the display. One or more of the entries may correspond to video files, so that when one of the video file content entries is selected, video content of the video file corresponding to the selected video file content entry is displayed in the primary segment of the display.

The content entries in the timeline are preferably ordered by date.

Each content entry corresponding to an image study may include text describing the image study and a date.

A content entry corresponding to an image study that has not been expanded can be expanded by selecting the content entry, thereby causing one or more thumbnail images corresponding to images series in the image study to be displayed in association with the content entry corresponding to the image study.

The selection of one of the displayed thumbnail images may be performed by a user clicking a mouse button on the input device while a cursor is displayed over one of the displayed thumbnail images to select that thumbnail image.

The selection of one of the sections in the positioning grid may be performed by a user clicking a mouse button on the input device while a cursor is displayed over one of the sections in the positioning grid to select that section of the positioning grid.

The positioning grid may be a rectangular array of segments, each segment being delimited by a rectangular boundary.

The computer processor may also be configured to display, after the image in the image series corresponding to the selected thumbnail image has been displayed in the section of the primary segment of the display represented by the selected section of the positioning grid, a different image in the image series in the same section of the primary segment of the display in response to input from the input device.

The invention also provides methods for performing the functions performed by the computer processor as described above.

DETAILED DESCRIPTION OF THE INVENTION

Figure 1:
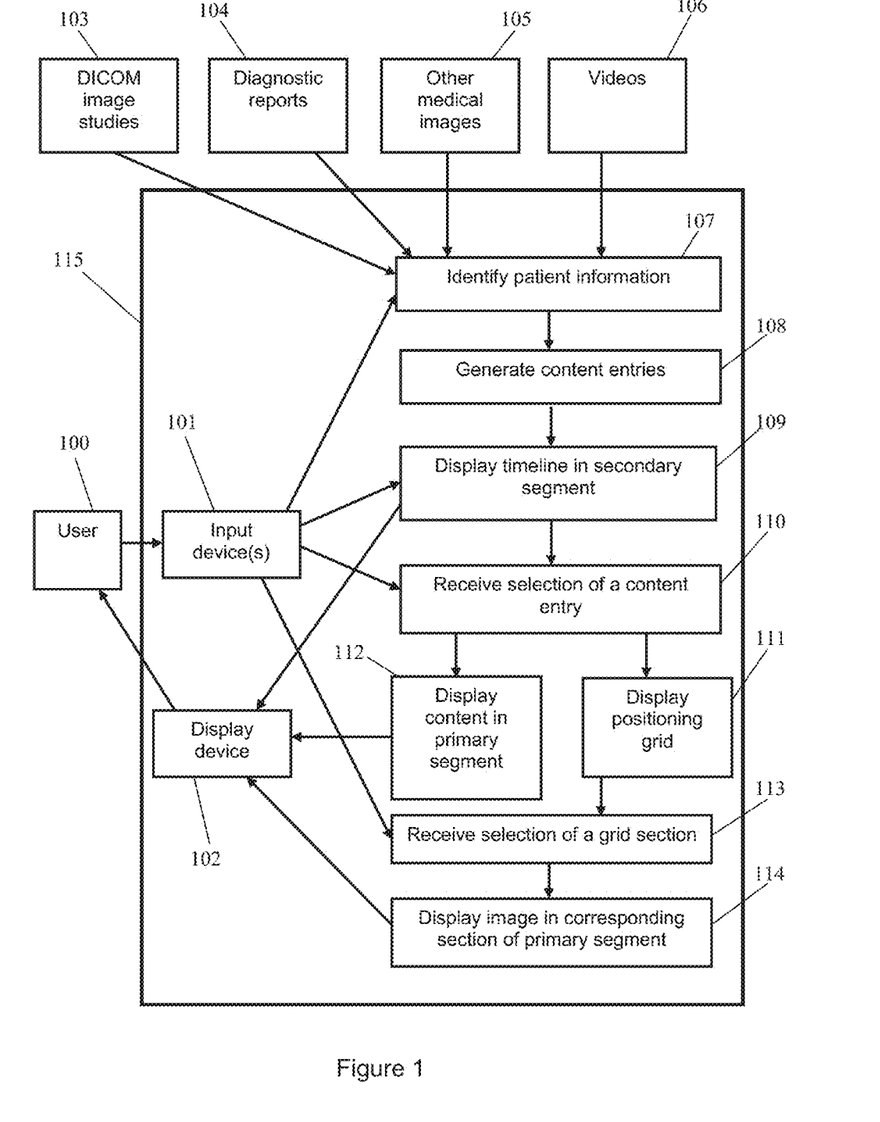
FIG. 1 depicts an embodiment of a medical information display system showing the major functional elements of the system.
Figure 2:
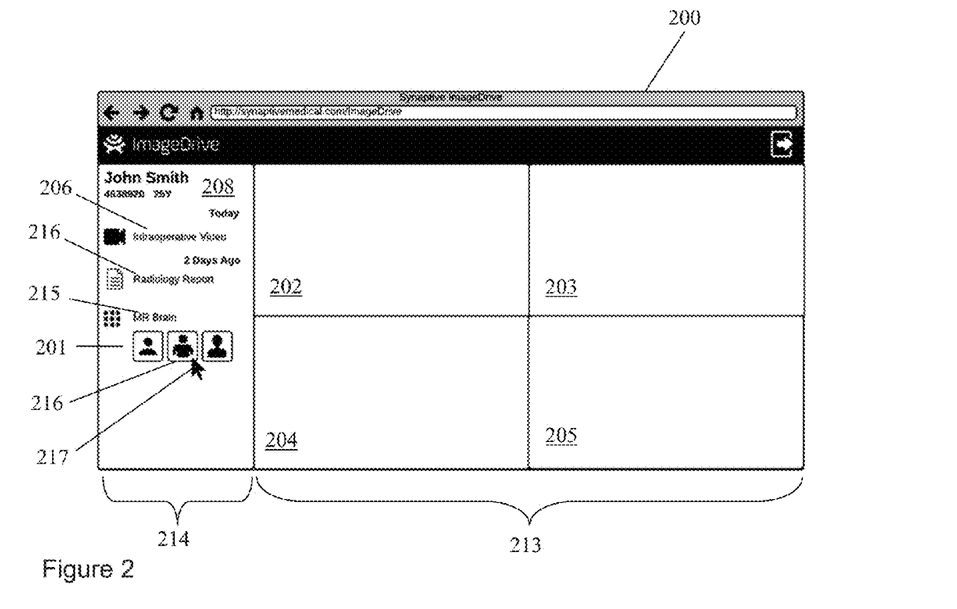
FIGS. 2-6 depict an example display showing the primary and secondary segments of the display, and showing a sequence of user actions beginning with FIG. 2 and ending with FIG. 6.

FIG. 2 shows a representation of a display 200 generated by the medical information display system 115, which is depicted in FIG. 1. The display 200 is divided into two non-overlapping segments: the primary segment 213 on the right, and the secondary segment 214 on the left. The display 200 may be a window on a monitor (display device), the entire monitor screen, or multiple monitor screens, for example. The secondary segment 214 is generally smaller than the primary segment 213. The secondary segment 214 may be a rectangular area to the left of the display as shown in FIG. 2, or it may be placed elsewhere and/or be otherwise configured, but in any case not overlapping the primary segment 213. The secondary segment 214 of the display 200 displays a timeline 208. In the depicted embodiment, the timeline consists of a sequence of content entries 206, 216, 215, each having an associated date, and ordered in the timeline according to the associated dates. Content entries with an earlier date are depicted below content entries with later dates. The date of a content entry may be displayed with the content entry, for example to the right of the content entry, or, for example, a relative date may be displayed, such as "2 days ago" as shown in FIG. 2. The date includes the year, month and day, and may further include the time of day, when the associated content was received, obtained, or last modified, for example.

A content entry is an identifier that indicates to the user what displayable content is associated with the content entry. For example, content entry 216 is "Radiology Report". If the user were to select (e.g. click on) this entry, the system may display a portion of the contents of the associated content (a document in this case) in the primary segment 213, or alternatively, as discussed below, may display a positioning grid 209 to permit the user to specify where in the primary segment 213 the associated content should be displayed. An image study (typically a DICOM image study) is a special content entry, such as content entry 215 ("MR BRAN") shown in the timeline 208 in FIG. 2. "MR BRAIN" refers to a magnetic resonance imaging image study of the patient's brain.

Content such as a diagnostic report can be generically referred to as a "text file", although such files may include graphics in addition to text. Such content is typically stored as an operating system file in formats such as PDF, Word, PowerPoint (PPT), HTML and .txt.

An image study content entry represents an image study that is made up of one or more image series (typically DICOM image series). Each image series includes a sequence of one or more images, typically tagged by the date of acquisition and ordered in the series based on the date (the date generally including the time of day). An image study content entry can be opened or expanded by the user, for example by clicking on the image study content entry with a mouse, or touching it if the display has a touch screen. When the image study content entry has been expanded, as has the image study content entry 215 shown in FIG. 2, then an image series content entry 201 for each image series contained in the image study is displayed below the image study content entry as a sequence of thumbnail images 201. In the embodiment shown in FIG. 2, each image series content entry is a thumbnail image of one of the images in the image series, such as item 216 in FIG. 1. The thumbnails may be arranged in a grid pattern. In the example shown in FIG. 2, a 1×3 grid is employed. Thumbnails representing all the series in the image study may be shown, or, if there are many series in the study, thumbnails representing a subset of the series in the study may be shown (such as the first 16 series as four rows of four thumbnails for example) along with a control that allows scrolling through content entries for the rest of the image series content entries. Of course, content entries other than thumbnail images may alternately be used to depict image series. The term "thumbnail" as used herein is intended to include all such alternatives, such as textual entries. Although viewports are generally rectangular, and all of the same size, this is not by any means essential. For example, the primary segment may be initially divided into two equal size sections, and then one of those sections subdivided into four segments, so that there are five segments in total, which one being equal in size to the total of the other four.

Image files and series may be stored in various formats, such as DICOM, PEG, TIFF, PNG, etc.

In order to view images in an image series, the image series must be associated with a viewport, which is a section of the primary segment 213 of the display. A "viewport" has the same meaning as a "section of the primary segment" herein. In the example shown in FIG. 2, there are four such viewports 202-205. Depending on the size and number of monitors on which the display 200 is displayed, there may be more or fewer viewports, such as two, four, eight, twelve, etc. which may be arranged as a grid having, for example, one, two or three rows of viewports. The number and arrangement of viewports may be configurable by the user. In order to associate an image series with a viewport to view images in the series, the system may allow the user to drag the thumbnail representing the image series using a mouse to the section of the primary segment 213 where the user desires the image series to be displayed. However, when the user is processing a large volume of image series over an extended time, this approach requires a lot of mouse travel and can lead to strain on the user's hand/arm. Also it requires significant amount of time to lay out the study.

Figure 3:
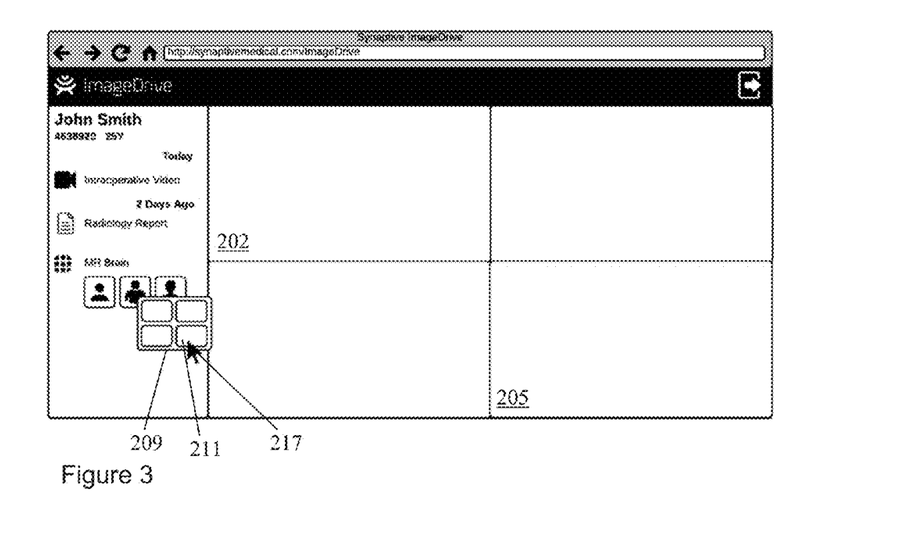

In order to address this problem, the system employs a positioning grid 209. When the user selects (e.g. clicks on) one of the thumbnails, the system automatically brings up a positioning grid 209 near the current mouse pointer position in the secondary segment so that it is near the selected content entry and does not block any content shown in the primary segment. The positioning grid 209, as shown in FIG. 3, is a representation of the sections (viewports) of the primary segment 200. In the embodiment depicted in FIGS. 2-6, the primary segment 200 is organized as a 2×2 rectangular array of viewports 202-205, each viewport being rectangular. As a result, the positioning grid 209 is also a 2×2 rectangular array, with one section representing each of the sections of the primary segment of the display. For example, the bottom right section 211 of the positioning grid 209 represents the bottom right section 205 of the primary segment 213. When the user then selects a section of the positioning grid 209, an image contained in the image series corresponding to the selected thumbnail image is automatically displayed in the section of the primary segment of the display represented by the selected section of the positioning grid.

Figure 4:
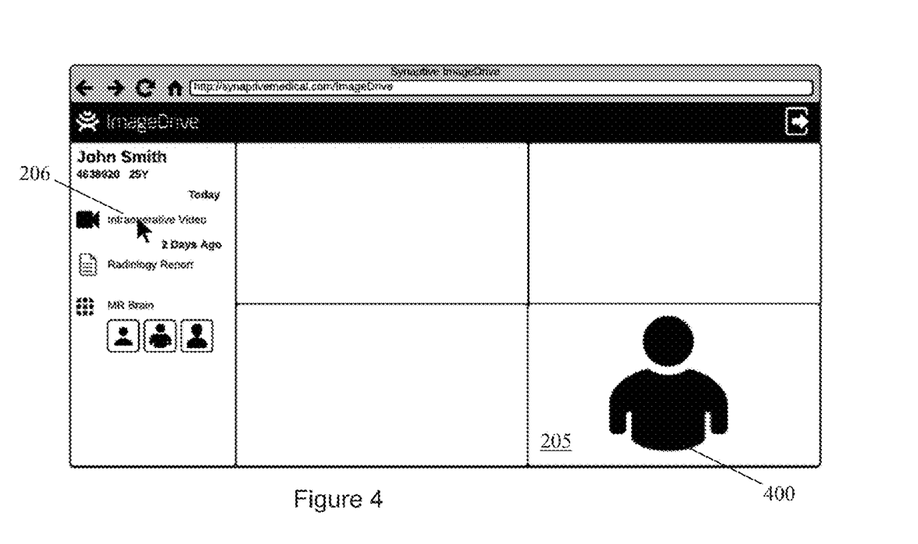

In FIG. 2, the user has positioned the cursor over the middle thumbnail 216. After the user clicks the mouse button (or otherwise selects the thumbnail 216), a positioning grid 209 is displayed as shown in FIG. 3. The user can then select one of the sections of the positioning grid 209 in order to specify where to display images from the series corresponding to the selected thumbnail. In FIG. 3, the user has moved the cursor 217 over (i.e. pointing at) the bottom right section 211 of the positioning grid 209. If the user then clicks the mouse to select that section of the positioning grid 209, then the system displays an image 400 in the series corresponding to the selected thumbnail 216 in viewport 205, as depicted in FIG. 4.

Any image in the series may be selected by the system to be displayed initially in the primary segment section. For example, an image near the midpoint of the series may be selected for initial display. The user can then change the image displayed in the segment. For example, the system may change the image currently displayed in a viewport to the next image in the series when the user left clicks on the displayed image (or an associated control), and to the previous image in the series when the user right clicks on the image, or vice versa. Mechanisms to jump to particular images in the series, such as the first or last image, or to a particular image in the series may also be provided.

The user may repeat this sequence of actions to display images from other image series of the same study in the other primary segment sections, display images from image series that are part of other images studies, or even to display another image from the same series that is already displayed in one viewport in another viewport, which allows side-by-side comparison of multiple images in the same series.

The user may also select other content entries to populate other sections of the primary segment, such as images from a series in a different image study, or a video.

Figure 5:
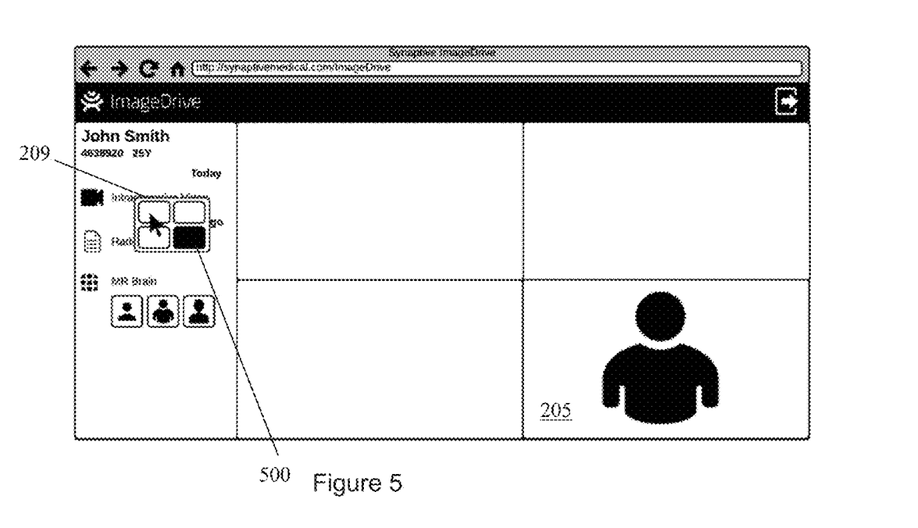

The sections of the positioning grid 209 preferably provide an indication of which viewports are currently displaying an image. For example, the bottom right section 500 in FIG. 5 is darkened (i.e. black), indicating that there is an image currently being displayed in viewport 205, being the bottom right viewport. Alternatively other colours or shading, such as grey shading, may be used to indicate that the corresponding viewport is in use. The user may still select a section of the positioning grid representing a viewport that is in use, but this will cause the currently displayed image in the corresponding viewport to be replaced with an image from the newly selected image series. The system may also allow users to change the viewport that particular content is displayed in by, for example, dragging and dropping the content from one viewport to another.

In FIG. 4, after an image 400 from the selected images series has been displayed in viewport 205, the user has moved the cursor to be over the content entry 206 entitled "Interoperative Video". By clicking the mouse button then, the user causes the system to bring up the positioning grid 209 shown in FIG. 5. Note that, in some embodiments, the user may have the option of ether bringing up the positioning grid 209, if the user wants to view the associated content in a viewport, or of otherwise directly selecting the content for viewing. In the latter case, the associated content may be displayed in a pre-determined manner, such as by using all the space available in the primary segment 213. For example, a left mouse button click may bring up the positioning grid 209, and an item in a right-click menu, such as "view now", may cause immediate display of the associated content in a pre-determined position/size, such as by using the entire primary segment, or by selecting an unused viewport.

Figure 6:
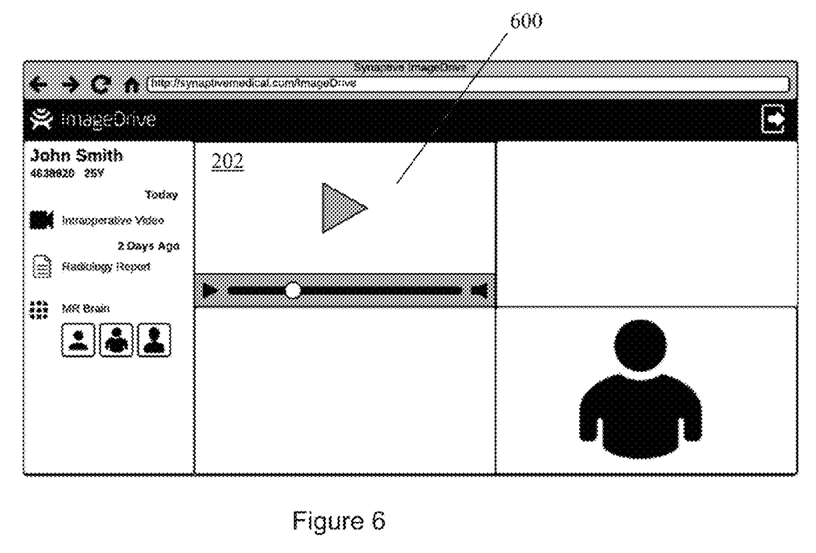

After the user selects the content entry 206 by clicking the mouse button, the system displays the positioning grid 209 as shown in FIG. 5. As shown in FIG. 5, the user has then moved the cursor over the top left section of the positioning grid 209. If the user then clicks a mouse button to select the top left section, then the video associated with content entry 206 is displayed in the top left viewport 202 as shown in FIG. 6. The video may start playing immediately, or a "play" control 600 may be displayed to allow the user to choose when to start playing the video. Other video controls may also be provided below in the viewport 202, such as to pause, skip or restart. An option to play the video in full screen mode may also be provided such that after the video is finished or otherwise stopped, the display returns to the state shown in FIG. 6.

A representation of the system 115 is shown in FIG. 1. The system includes one or more input devices 101 for receiving input from a user 100 (such as a mouse and keyboard), a display device 102 for displaying the displays generated by the system, and a computer processor that is configured to perform a number of functions 107-114. The system accesses medical information from various external sources, such as picture archiving and communication systems (PACSs), medical information systems, laboratory information systems and radiology information systems. Such information includes DICOM image studies 103, diagnostic reports 104, other medical images 105 and videos 106, such as video of an operation.

In one mode of operation, the user 100 may indicate the identity of a patient for which the user wants to view related medical information. The system then identifies patient information 107 for that patient, and generates a time line of content entries 108. The timeline is then displayed in the secondary segment 109 of the display on the display device 102, initially with the primary segment being blank (for example having a 2×3 array of empty square viewports). The user 100 can manipulate the timeline, for example to scroll it in time, or to expand or contract certain content entries, such as image study content entries. When the user selects one of the content entries, and the system receives the selection 110, then the system either displays some or of the content associated with the selected content entry in the primary segment 112, or the system displays a positioning grid 111. For example, if the user selected a video content element in a manner indicating that the video should be immediately played, the system would then play the associated video in the primary segment 112. If the user selected a content entry representing a text or PDF diagnostic report in a manner indicating that the report should be immediately displayed, then the contents of that report (or a first portion of which) would then be displayed in the primary segment 112 on the display device 102.

If an image series content element was selected, or a selection was otherwise made in a manner indicating that displaying the associated content in a viewport is desired, and the system displays a positioning grid 111, then the user may next select a section of the grid, and when the system receives the selection of the section of the positioning grid 113, then the system displays an image from the series corresponding to the selected image series content element in the viewport corresponding to the selected section of the positioning grid in the primary segment 114. As discussed above, this can be repeated to display images from other image series in an image study in other viewports, or to view other content, such as videos and diagnostic reports in other viewports.

In many cases, there is often a great deal of data associated with a patient, and much of it may be of no interest ("noise") to a particular care provider. For example, a neurosurgeon probably doesn't care about an x-ray of the patient's broken leg from a year ago. Therefore in some embodiments, in order to improve effectiveness and efficiency, the system may be configured to intelligently filter/group the timeline data by relevancy to a particular medical condition. For example, the system may allow the user to provide keywords, or a logical expression using keywords, to use to determine which content entries to display in the timeline. Content that does not match any of the keywords, or fails to meet the specified logical expression, is then not shown in the timeline when filtering is enabled. In some embodiments, the user may simply indicate a condition or body part, and the system then only includes content entries in the timeline that correspond to content that is relevant, or may be relevant to the condition or body part. In some cases, this may be done by excluding content from the timeline only when the system can determine with a high degree of confidence that the content is not related to the condition or body part.

In related embodiments, the system may be designed so that the user can instruct the system to group all the available content into "clusters" based on the interrelationships of the data. Such clusters of content may of course be overlapping time, an that each effectively constitutes a separate timeline. These could be identified in the main timeline, for example, by colour-coding each cluster. The user may then have the option of suppressing the display of one or more of the clusters. In many cases, a user may only need to peruse one of the clusters and would then configure the interface to only show that cluster in the timeline. Of course, such clustering is necessarily imperfect, so the system also provides mechanisms for the user to correct the allocation of content to clusters.

In some embodiments, a high level graphical representation of all of the "events" and artefacts that belong to the patient may be included in the timeline in order to facilitate identification of gaps and clusters of care.

As will be clear to those skilled in the art, any selection described herein as being done by positioning a cursor over an item and clicking a mouse button may be done in other ways, such as by touching a point of the screen, in embodiments where the monitor has touch capability.

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

White some embodiments or aspects of the present disclosure may be implemented in fully functioning computers and computer systems, other embodiments or aspects may be capable of being distributed as a computing product in a variety of forms and may be capable of being applied regardless of the particular type of machine or computer readable media used to actually effect the distribution.

At least some aspects disclosed may be embodied, at least in part, in software. That is, some disclosed techniques and methods may be carried out in a computer system or other data processing system in response to its processor, such as a microprocessor, executing sequences of instructions contained in a memory, such as ROM, volatile RAM, non-volatile memory, cache or a remote storage device.

A non-transitory computer readable storage medium may be used to store software and data which when executed by a data processing system causes the system to perform various methods or techniques of the present disclosure. The executable software and data may be stored in various places including for example ROM, volatile RAM, non-volatile memory and/or cache. Portions of this software and/or data may be stored in any one of these storage devices.

Examples of computer-readable storage media may include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. The storage medium may be the internet cloud, or a computer readable storage medium such as a disc.

Furthermore, at least some of the methods described herein may be capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

At least some of the elements of the systems described herein may be implemented by software, or a combination of software and hardware. Elements of the system that are implemented via software may be written in a high-level procedural language such as object oriented programming or a scripting language. Accordingly, the program code may be written in C, C++, J++, or any other suitable programming language and may comprise modules or classes, as is known to those skilled in object oriented programming. At least some of the elements of the system that are implemented via software may be written in assembly language, machine language or firmware as needed. In any case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

While the teachings described herein are in conjunction with various embodiments for illustrative purposes, it is not intended that the teachings be limited to such embodiments. On the contrary, the teachings described and illustrated herein encompass various alternatives, modifications, and equivalents, without departing from the described embodiments, the general scope of which is defined in the appended claims. Except to the extent necessary or inherent in the processes themselves, no particular order to steps or stages of methods or processes described in this disclosure is intended or implied, in many cases the order of process steps may be varied without changing the purpose, effect, or import of the methods described.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

What is claimed is:

1. A method of displaying content in a primary segment of a display having one fixed primary segment and one fixed secondary segment, the content comprising a plurality of medical images organized as a plurality of image series, the method comprising:

displaying a plurality of thumbnail images correspondingly representing the plurality of image series in a secondary segment of the display, the primary segment and secondary segment being non-overlapping, and the content displayed in the secondary segment does not block any of the content displayed in the primary segment;

displaying a timeline in the second segment of the display, the timeline comprising a plurality of content entries, each content entry having a date associated therewith and corresponding to the content that can be displayed in the primary segment, wherein one or more of the plurality of content entries correspond to image studies, one or more of the image studies comprising a plurality of image series, wherein for each of the one or more of the plurality of content entries, one or more of the corresponding plurality of image series is represented in the timeline by one of the content entries that is a thumbnail image of one of the images in the plurality of image series;

in response to a selection of one of the content entries from an input device by a user, expanding the content entry corresponding to an image study that has not been expanded and displaying below the content entry in a grid pattern the plurality of thumbnail images corresponding to the plurality of images series in the image study;

receiving a selection of one of the thumbnail images of the plurality of thumbnail images corresponding to the content entry in the secondary segment of the display from the input device;

in response to the selection of the thumbnail image, automatically displaying near the selected thumbnail image in the secondary segment, without blocking the content displayed in the primary segment, a positioning grid having a plurality of positioning grid sections, each positioning grid section of the positioning grid representing a corresponding section of the primary segment of the display;

receiving a selection of one of the plurality of positioning grid sections of the positioning grid from the input device; and in response to the selection of the positioning grid section, updating the display to cause one of the image series of the plurality of image series, represented by the selected thumbnail image, to be displayed in the section of the primary segment of the display represented by the selected positioning grid section.

2. The method of claim 1, wherein one or more of the content entries correspond to text files, and wherein when one of the text file content entries is selected, a portion of the content of the text file corresponding to the selected text file content entry is displayed in the primary segment of the display.

3. The method of claim 1, wherein one or more of the entries correspond to video files, and wherein when one of the video file content entries is selected, video content of the video file corresponding to the selected video file content entry is displayed in the primary segment of the display.

4. The method of claim 1, wherein the content entries in the timeline are ordered by date.

5. The method of claim 1, wherein each content entry corresponding to an image study comprises text describing the image study and a date.

6. The method of claim 1, wherein each of the image series is a DICOM series.

7. The method of claim 1, wherein the selection of one of the displayed thumbnail images is performed by a user clicking a mouse button on the input device while a cursor is displayed over one of the displayed thumbnail images to select that thumbnail image.

8. The method of claim 1, wherein the method further comprises displaying, after the image in the image series corresponding to the selected thumbnail image has been displayed in the section of the primary segment of the display represented by the selected section of the positioning grid, a different image in the image series in the same section of the primary segment of the display in response to input from a user.

9. A system of displaying content in a primary segment of a display having one fixed primary segment and one fixed secondary segment, the content comprising a plurality of medical images organized as a plurality of image series, the system comprising:

an input device for receiving input from a user;

a display device;

a computer processor in electronic communication with the input device and the display device, the computer processor being configured to:

display a plurality of thumbnail images correspondingly representing the plurality of image series in a secondary segment of the display on the display device, the primary segment and secondary segment being non-overlapping, and the content displayed in the secondary segment does not block any of the content displayed in the primary segment;

display a timeline in the second segment of the display, the timeline comprising a plurality of content entries, each content entry having a date associated therewith and corresponding to the content that can be displayed in the primary segment, wherein one or more of the plurality of content entries correspond to image studies, one or more of the image studies comprising a plurality of image series, wherein for each of the one or more of the plurality of content entries, one or more of the corresponding plurality of image series is represented in the timeline by one of the content entries that is a thumbnail image of one of the images in the plurality of image series;

in response to a selection of one of the content entries from the input device by the user, expand the content entry corresponding to an image study that has not been expanded and display below the content entry in a grid pattern the plurality of thumbnail images corresponding to the plurality of images series in the image study;

receive a selection of one of the thumbnail image of the plurality of thumbnail images corresponding to the content entry in the secondary segment of the display from the input device;

in response to the selection of the thumbnail image, automatically display near the selected thumbnail image in the secondary segment, without blocking the content displayed in the primary segment, a positioning grid having a plurality of positioning grid sections; each positioning grid section of the positioning grid representing a corresponding section of the primary segment of the display;

receive a selection of one of the plurality of positioning grid sections of the positioning grid from the input device; and in response to the selection of the positioning grid section, update the display to cause one of the image series of the plurality of image series, represented by the selected thumbnail image, to be displayed in the section of the primary segment of the display represented by the selected positioning and section.

10. The system of claim 9, wherein one or more of the entries correspond to video files, and wherein when one of the video file content entries is selected, video content of the video file corresponding to the selected video file content entry is displayed in the primary segment of the display.

11. The system of claim 9, wherein the content entries in the timeline are ordered by date.

12. The system of claim 9, wherein each content entry corresponding to an image study comprises text describing the image study and a date.

13. The system of claim 9, wherein a content entry corresponding to an image study that has not been expanded can be expanded by selecting the content entry, thereby causing one or more thumbnail images corresponding to images series in the image study to be displayed in association with the content entry corresponding to the image study.

14. The system of claim 9, wherein the selection of one of the displayed thumbnail images is performed by a user clicking a mouse button on the input device while a cursor is displayed over one of the displayed thumbnail images to select that thumbnail image.

15. The system of claim 9, wherein the selection of one of the sections in the positioning grid is performed by a user clicking a mouse button on the input device while a cursor is displayed over one of the sections in the positioning grid to select that section of the positioning grid.

16. The system of claim 15, wherein the positioning grid is a rectangular array of segments, each segment being delimited by a rectangular boundary.

17. The system of claim 9, wherein the computer processor is further configured to display, after the image in the image series corresponding to the selected thumbnail image has been displayed in the section of the primary segment of the display represented by the selected section of the positioning grid, a different image in the image series in the same section of the primary segment of the display in response to input from the input device.

* * * * *